United States Patent
Kim

(10) Patent No.: US 12,451,207 B2
(45) Date of Patent: Oct. 21, 2025

(54) SEMICONDUCTOR DEVICES FOR DETECTING DEFECTS IN ERROR CORRECTION CIRCUITS, AND METHODS OF PERFORMING TEST MODE OPERATIONS

(71) Applicant: SK hynix Inc., Icheon-si (KR)

(72) Inventor: Hyun Seung Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 182 days.

(21) Appl. No.: 18/489,567

(22) Filed: Oct. 18, 2023

(65) Prior Publication Data

US 2024/0404616 A1    Dec. 5, 2024

(30) Foreign Application Priority Data

Jun. 5, 2023   (KR) .................. 10-2023-0072363

(51) Int. Cl.
*G11C 29/42*   (2006.01)
*G11C 29/12*   (2006.01)
*G11C 29/46*   (2006.01)

(52) U.S. Cl.
CPC .......... *G11C 29/42* (2013.01); *G11C 29/1201* (2013.01); *G11C 29/46* (2013.01)

(58) Field of Classification Search
CPC ...... G11C 29/42; G11C 29/1201; G11C 29/46
See application file for complete search history.

(56) References Cited

U.S. PATENT DOCUMENTS

| 2006/0133166 A1* | 6/2006 | Kikutake ............ G06F 11/1032 |
| | | 365/201 |
| 2008/0126905 A1* | 5/2008 | Deguchi ............. G06F 11/1044 |
| | | 714/746 |
| 2018/0129560 A1* | 5/2018 | Byeon ..................... G11C 29/52 |
| 2020/0111537 A1 | 4/2020 | Chen et al. |

FOREIGN PATENT DOCUMENTS

KR       1020190086936 A      7/2019

* cited by examiner

*Primary Examiner* — Han Yang
(74) *Attorney, Agent, or Firm* — WILLIAM PARK AND ASSOCIATES LTD.

(57) ABSTRACT

A semiconductor device includes a read circuit configured to latch read parity including error information on read data output from a memory circuit to generate latch parity when a test read control signal is enabled. The semiconductor device also includes a parity selection circuit configured to output the latch parity as parity when a test selection signal is enabled. The semiconductor device further includes a write circuit configured to receive write data generated from data and the parity, and to correct error of the write data, based on write parity including error information on the write data and the parity to generate correction data when a test write control signal is enabled.

30 Claims, 10 Drawing Sheets

SEMICONDUCTOR DEVICES FOR DETECTING DEFECTS IN ERROR CORRECTION CIRCUITS, AND METHODS OF PERFORMING TEST MODE OPERATIONS

CROSS-REFERENCE TO RELATED APPLICATION

The present application claims priority under 35 U.S.C. 119(a) to Korean Patent Application No. 10-2023-0072363, filed on Jun. 5, 2023, in the Korean Intellectual Property Office, which is incorporated herein by reference in its entirety.

BACKGROUND

1. Technical Field

Embodiments of the present disclosure relate to semiconductor devices for detecting defects in an error correction circuit in a test mode, and methods of performing test mode operations.

2. Related Art

Recently, to increase the operating speed of a semiconductor device, methods that input/output multiple bits of data per clock cycle such as DDR2, DDR3, DDR4, DDR5, and the like have been used. When the data input/output speed increases, the probability of errors occurring during the process of data transmission increases, so a separate device and method for ensuring reliability of data transmission is additionally required.

A method of guaranteeing the reliability of data transmission is used by generating an error check code capable of checking whether an error occurred whenever data is transmitted and transmitting the error check code along with the data. The error check code include an error detection code (EDC) capable of detecting an error that has occurred, and an error correction code (ECC) capable of self-correcting an error when the error occurs.

SUMMARY

In accordance with the present disclosure is a semiconductor device including: a read circuit configured to latch read parity including error information on read data output from a memory circuit to generate latch parity when a test read control signal is enabled; a parity selection circuit configured to output the latch parity as parity when a test selection signal is enabled; and a write circuit configured to receive write data generated from data and the parity, and to correct error of the write data, based on write parity including error information on the write data and the parity to generate correction data when a test write control signal is enabled.

Also in accordance with the present disclosure is a semiconductor device including: a control circuit configured to generate a test selection signal for generating a test mode, to generate a test read control signal and a test write control signal, and to generate a read strobe signal and a write strobe signal; a parity selection circuit configured to output one of external parity input from an external device and latch parity as parity, based on the test selection signal; and a write circuit configured to receive write data generated from data and the parity, and to correct an error of the write data, based on write parity including error information on the write data and the parity to generate correction data, when a test write control signal is enabled.

Additionally in accordance with the present disclosure is a method of performing a test mode operation including: a first error correction circuit setting step of turning off a write error correction circuit for generating write parity including error information of write data generated from data input from an external device, and turning on a read error correction circuit for generating read parity including error information on read data output from a memory circuit; and a first write read operation step of storing the write data in a first selected location of the memory circuit, based on an address in a test mode, and outputting the write data stored in the first selected location of the memory circuit as the read data.

DETAILED DESCRIPTION OF THE EMBODIMENTS

In the following description of embodiments, when a parameter is referred to as being "predetermined," it may be intended to mean that a value of the parameter is determined in advance when the parameter is used in a process or an algorithm. The value of the parameter may be set when the process or the algorithm starts or may be set during a period that the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage correspond to a signal having a logic "high" level, a signal having a second voltage correspond to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

Various embodiments of the present disclosure will be described hereinafter in more detail with reference to the accompanying drawings. However, the embodiments described herein are for illustrative purposes only and are not intended to limit the scope of the present disclosure.

Figure 1:
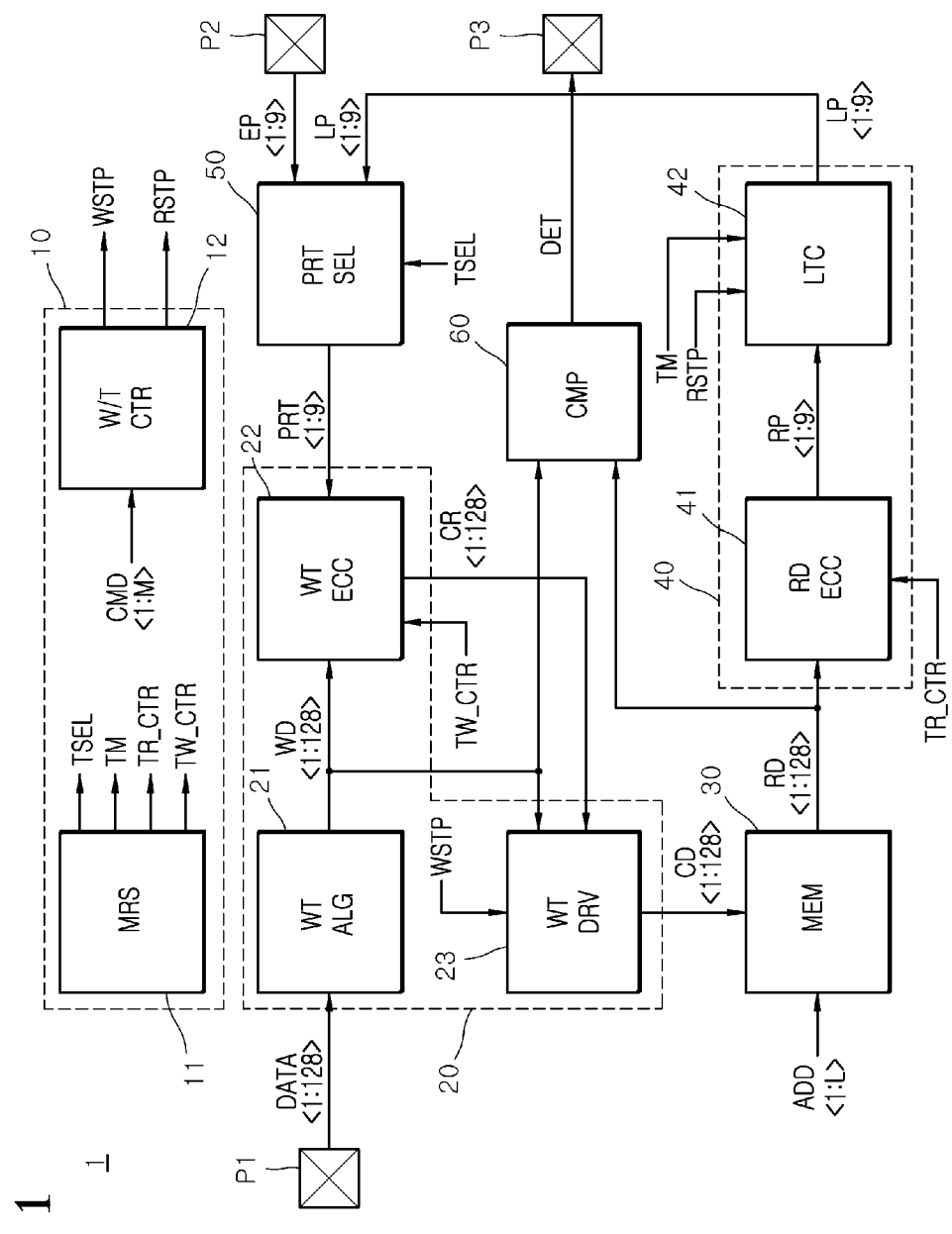
FIG. 1 is a block diagram illustrating a configuration of a semiconductor device according to an embodiment of the present disclosure.

FIG. 1 is a block diagram illustrating a configuration of a semiconductor device 1 according to an embodiment of the present disclosure. As shown in FIG. 1, the semiconductor device 1 may include a control circuit 10, a write circuit 20, a memory circuit (MEM) 30, a read circuit 40, a parity selection circuit (PRT SEL) 50, and a comparison circuit (CMP) 60.

The control circuit 10 may include a mode register set (MRS) 11 and a write/read control circuit (W/T CTR) 12.

The mode register set 11 may generate a test selection signal TSEL and a test mode signal TM in a test mode. The mode register set 11 may generate the test selection signal TSEL that is enabled in the test mode. The mode register set 11 may generate the test mode signal TM that is enabled to perform a compression test in the test mode. The mode register set 11 may generate a test read control signal TR_CTR in the test mode, and then, may generate a test write control signal TW_CTR. The mode register set 11 may generate the test read control signal TR_CTR that is enabled to perform a read operation in the test mode. The mode register set 11 may generate the test write control signal TW_CTR that is enabled to perform a write operation in the test mode. The mode register set 11 may be configured as a general mode register set (MRS) including a plurality of registers and generating various signals for controlling the operation of the semiconductor device 10. The test mode may be set as a test for detecting a defect in an error correction circuit, based on internally generated parity without receiving parity from an external device in a wafer state before the semiconductor device 1 is packaged. The external device may be implemented as a test device for controlling the test mode of the semiconductor device 1.

The write/read control circuit 12 may generate a write strobe signal WSTP and a read strobe signal RSTP, based on first to "M"$^{th}$ commands CMD<1:M> in the test mode. The write/read control circuit 12 may generate the write strobe signal WSTP including a pulse generated when the first to "M"$^{th}$ commands CMD<1:M> have a logic level combination for performing a write operation in the test mode. The write/read control circuit 12 may generate the read strobe signal RSTP including a pulse generated when the first to "M"$^{th}$ commands CMD<1:M> have a logic level combination for performing a read operation in the test mode.

The control circuit 10 may generate the test selection signal TSEL that is enabled in the test mode. The control circuit 10 may generate the test mode signal TM that is enabled to perform a compression test in the test mode. The control circuit 10 may generate the test read control signal TR_CTR and the test write control signal TW_CTR that are sequentially enabled in the test mode. The control circuit 10 may generate the write strobe signal WSTP including a pulse generated during the write operation in the test mode. The control circuit 10 may generate the read strobe signal RSTP including a pulse generated during the read operation in the test mode.

The write circuit 20 may include a write alignment circuit (WT ALG) 21, a write error correction circuit (WT ECC) 22, and a write driver (WT DRV) 23.

The write alignment circuit 21 may receive first to 128$^{th}$ data DATA<1:128> through a first pad P1. The write alignment circuit 21 may sequentially latch the first to 128$^{th}$ data DATA<1:128> input in series. The write alignment circuit 21 may align the latched first to 128$^{th}$ data DATA<1:128> to generate first to 128$^{th}$ write data WD<1:128>. The write alignment circuit 21 may output the first to 128$^{th}$ write data WD<1:128> in parallel.

The write error correction circuit 22 may receive the first to 128$^{th}$ write data WD<1:128> and first to ninth parity PRT<1:9> when the test write control signal TW_CTR is enabled. The write error correction circuit 22 may perform an ECC encoding operation on the first to 128$^{th}$ write data WD<1:128> to generate first to eighth write parity (WP<1:8> of FIG. 2) when the test write control signal TW_CTR is enabled. The write error correction circuit 22 may compare the first to eighth write parity (WP<1:8> of FIG. 2) and the first to eighth parity PRT<1:8> to generate first to 128$^{th}$ error correction signals CR<1:128> when the test write control signal TW_CTR is enabled. The write error correction circuit 22 may block generation of the first to 128$^{th}$ error correction signals CR<1:128> when the test write control signal TW_CTR is disabled. The ninth parity PRT<9> may include 2-bit error information for first to 128$^{th}$ read data RD<1:128> or the first to 128$^{th}$ data DATA<1:128>. For example, the fact that the ninth parity PRT<9> is at a logic "high" level may mean that a 2-bit error occurred in the first to 128$^{th}$ read data RD<1:128> or in the first to 128$^{th}$ data DATA<1:128>. The write error correction circuit 22 may be implemented as a general ECC circuit using a single error correction-double error detection (SEC-DED) code for correcting a 1-bit error and detecting a 2-bit error.

The write driver 23 may generate first to 128$^{th}$ correction data CD<1:128> from the first to 128$^{th}$ write data WD<1:128> in synchronization with the write strobe signal WSTP. The write driver 23 may correct an error included in the first to 128$^{th}$ write data WD<1:128> to generate the first to 128$^{th}$ correction data CD<1:128>, based on the first to 128$^{th}$ error correction signals CR<1:128> in synchronization with the write strobe signal WSTP. For example, when the first error correction signal CR<1> is generated at a logic "high" level, the write driver 23 may invert a logic level of the first write data WD<1> among the first to 128$^{th}$ write data WD<1:128> to generate the first to 128$^{th}$ correction data CD<1:128>. The fact that the first error correction signal CR<1> is generated at a logic "high" level may mean that an error occurred in the first write data WD<1> among the first to 128$^{th}$ write data WD<1:128>.

The write circuit 20 may latch the first to 128$^{th}$ data DATA<1:128> input through the first pad P1. The write circuit 20 may align the latched first to 128$^{th}$ data DATA<1:128> to generate the first to 128$^{th}$ write data WD<1:128>. The write circuit 20 may latch and parallelize the first to 128$^{th}$ data DATA<1:128> that are input in series from the external device to generate the first to 128$^{th}$ write data WD<1:128> in the test mode. The write circuit 20 may compare the first to eighth write parity (WP<1:8> of FIG. 2) and the first to eighth parity PRT<1:8> to generate the first to 128$^{th}$ error correction signals CR<1:128> in the test mode. The write circuit 20 may correct the errors included in the first to 128$^{th}$ write data WD<1:128>, based on the first to 128$^{th}$ error correction signals CR<1:128> to generate the first to 128$^{th}$ correction data CD<1:128> in the test mode.

The memory circuit 30 may store the first to 128$^{th}$ correction data CD<1:128> in a first selected location (memory cell), based on a first combination of first to "L"$^{th}$ addresses ADD<1:L> during the write operation in the test mode. During a read operation in the test mode, the memory circuit 30 may output the first to 128$^{th}$ correction data CD<1:128> stored in the first selected location (memory cell), based on the first combination of the first to "L"$^{th}$ addresses ADD<1:L> as first to 128$^{th}$ read data RD<1:128>. The memory circuit 30 may store the first to 128$^{th}$ correction data CD<1:128> in a second selected location (memory cell), based on a second combination of the first to "L"$^{th}$ addresses ADD<1:L> during a write operation in the test mode. During the read operation in the test mode, the memory circuit 30 may output the first to 128$^{th}$ correction data CD<1:128> stored in the second selected location (memory cell), based on the second combination of the first to "L"$^{th}$ addresses ADD<1:L> as the first to 128$^{th}$ read data RD<1:128>. The first selected location (memory cell) and the second selected location (memory cell) that are selected according to the combination of the first to "L"$^{th}$ addresses ADD<1:L> may mean the memory cells at different locations.

The read circuit 40 may include a read error correction circuit (RD ECC) 41 and a latch circuit (LTC) 42.

The read error correction circuit 41 may generate first to ninth read parity RP<1:9> including error information on the first to 128$^{th}$ read data RD<1:128> when the test read control signal TR_CTR is enabled. The read error correction circuit 41 may perform an ECC encoding operation on the first to 128$^{th}$ read data RD<1:128> to generate the first to ninth read parity RP<1:9> when the test read control signal TR_CTR is enabled. The read error correction circuit 41 may block generation of the first to ninth read parity RP<1:9> including the error information on the first to 128$^{th}$ read data RD<1:128> when the test read control signal TR_CTR is disabled. The first to eighth read parity RP<1:8> may be set to signals including the error information on the first to 128$^{th}$ read data RD<1:128>. The ninth read parity RP<9> may include 2-bit error information on the first to 128$^{th}$ read data RD<1:128>. For example, the fact that the ninth read parity RP<9> is at a logic "high" level may mean a case in which a 2-bit error occurred in the first to 128$^{th}$ read data RD<1:128>. The read error correction circuit 41 may be implemented as a general ECC circuit using the single error correction-double error detection (SEC-DED) code for correcting a 1-bit error and detecting a 2-bit error.

The latch circuit 42 may latch the first to ninth read parity RP<1:9> in synchronization with the read strobe signal RSTP. The latch circuit 42 may output the latched first to ninth read parity RP<1:9> as first to ninth latch parity LP<1:9>. The latch circuit 42 may generate all of the first to ninth latch parity LP<1:9> at the same logic level when the test mode signal TM is enabled. The latch circuit 42 may generate the first to ninth latch parity LP<1:9> having logic "low" levels when the test mode signal TM is enabled.

The read circuit 40 may generate the first to ninth read parity RP<1:9> including error information on the first to 128$^{th}$ read data RD<1:128> when the test read control signal TR_CTR is enabled during the read operation in the test mode. The read circuit 40 may latch the generate the first to ninth read parity RP<1:9> in synchronization with the read strobe signal RSTP to generate the first to ninth latch parity LP<1:9> during the read operation in the test mode. The read circuit 40 may generate all of the first to ninth latch parity LP<1:9> at the same logic level when the test mode signal TM is enabled during the read operation in the test mode.

The parity selection circuit 50 may receive first to ninth external parity EP<1:9> through a second pad P2. The parity selection circuit 50 may generate the first to ninth parity PRT<1:9> from one of the first to ninth external parity EP<1:9> and the first to ninth latch parity LP<1:9>, based on the test selection signal TSEL. The parity selection circuit 50 may output the first to ninth external parity EP<1:9> as the first to ninth parity PRT<1:9> when the test selection signal TSEL is disabled at a logic "low" level. The parity selection circuit 50 may output the first to ninth latch parity LP<1:9> as the first to ninth parity PRT<1:9> when the test selection signal TSEL is enabled at a logic "high" level. The first to eighth external parity EP<1:8> may be set as signals including the error information on the first to 128$^{th}$ data DATA<1:128> during the write operation. The ninth external parity EP<9> may include 2-bit error information on the first to 128$^{th}$ data DATA<1:128>. For example, the fact that the ninth external parity EP<9> is at a logic "high" level may mean a case in which a 2-bit error occurred in the first to 128$^{th}$ data DATA<1:128>.

The comparison circuit 60 may compare the first to 128$^{th}$ write data WD<1:128> and the first to 128$^{th}$ read data RD<1:128> to generate a detection signal DET. The comparison circuit 60 may generate the detection signal DET that is disabled at a logic "low" level when the first to 128$^{th}$ write data WD<1:128> and the first to 128$^{th}$ read data RD<1:128> have the same logic level combination in the test mode. The comparison circuit 60 may generate the detection signal DET that is enabled at a logic "high" level when the first to 128$^{th}$ write data WD<1:128> and the first to 128$^{th}$ read data RD<1:128> have different logic level combinations in the test mode. The comparison circuit 60 may generate the detection signal DET in various ways according to embodiments. For example, the comparison circuit 60 may be implemented to generate the detection signal DET that is enabled at a logic "high" level when at least one of the first to 128$^{th}$ error correction signals CR<1:128> is enabled. The detection signal DET may be output to the external device through a third pad P3. The detection signal DET may be output to a controller (1300 in FIG. 10) or a test device (not shown). The controller (1300 in FIG. 10) or the test device (not shown) may detect that there is no defect in the write error correction circuit 22 when the detection signal DET is disabled at a logic "low" level. The controller (1300 in FIG. 10) or the test device (not shown) may detect that a defect occurred in the write error correction circuit 22 when the detection signal DET is enabled at a logic "high" level.

Figure 2:
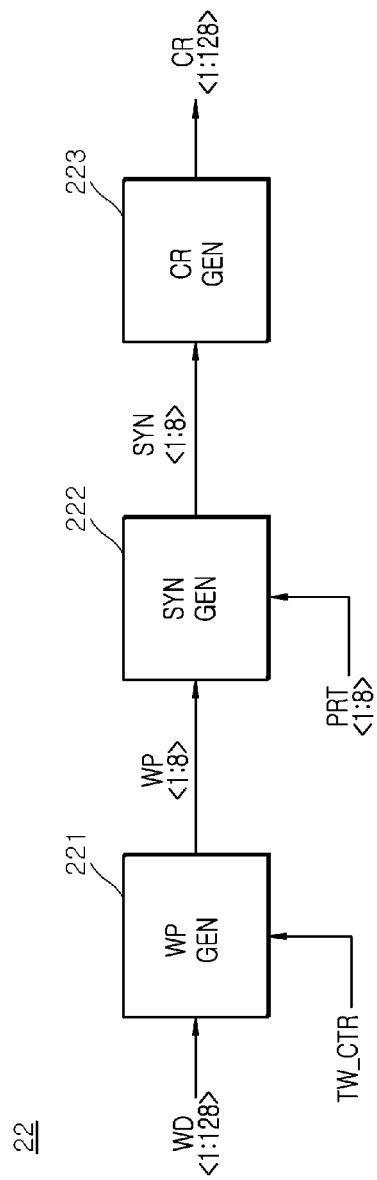
FIG. 2 is a block diagram illustrating a configuration according to an embodiment of a write error correction circuit included in the semiconductor device shown in FIG. 1.

FIG. 2 is a block diagram illustrating a configuration according to an embodiment of the write error correction circuit 22 included in the semiconductor device 1 shown in FIG. 1. The write error correction circuit 22 may include a write parity generation circuit (WP GEN) 221, a syndrome generation circuit (SYN GEN) 222, and an error correction signal generation circuit (CR GEN) 223.

The write parity generation circuit 221 may perform an ECC encoding operation on the first to 128$^{th}$ write data WD<1:8> to generate the first to eighth write parity WP<1:8> when the test write control signal TW_CTR is enabled. The write parity generation circuit 221 may block generation of the first to eighth write parity WP<1:8> when the test write control signal TW_CTR is disabled. The first to eighth write parity WP<1:8> may be set as signals including error information on the first to $128^{th}$ write data WD<1:128>. The write parity generation circuit 221 may be implemented as a general ECC circuit using the single error correction (SEC) code that corrects a 1-bit error. In FIG. 2, the write parity generation circuit 221 is implemented to generate the first to eighth write parity WP<1:8>, but may be implemented to detect a 2-bit error of the first to $128^{th}$ write data WD<1:128> using the single error correction-double error detection (SEC-DED) code that corrects 1-bit errors and detects 2-bit errors.

The syndrome generation circuit 222 may compare the first to eighth write parity WP<1:8> and the first to eighth parity PRT<1:8> to generate first to eighth syndromes SYN<1:8>.

The error correction signal generation circuit 223 may perform an ECC decoding operation on the first to eighth syndromes SYN<1:8> to generate the first to $128^{th}$ error correction signals CR<1:128>. For example, the error correction signal generation circuit 223 may enable the first error correction signal CR<1> for inverting the first write data WD<1> when an error occurs in the first write data WD<1> among the first to $128^{th}$ write data WD<1:128>.

Figure 3:
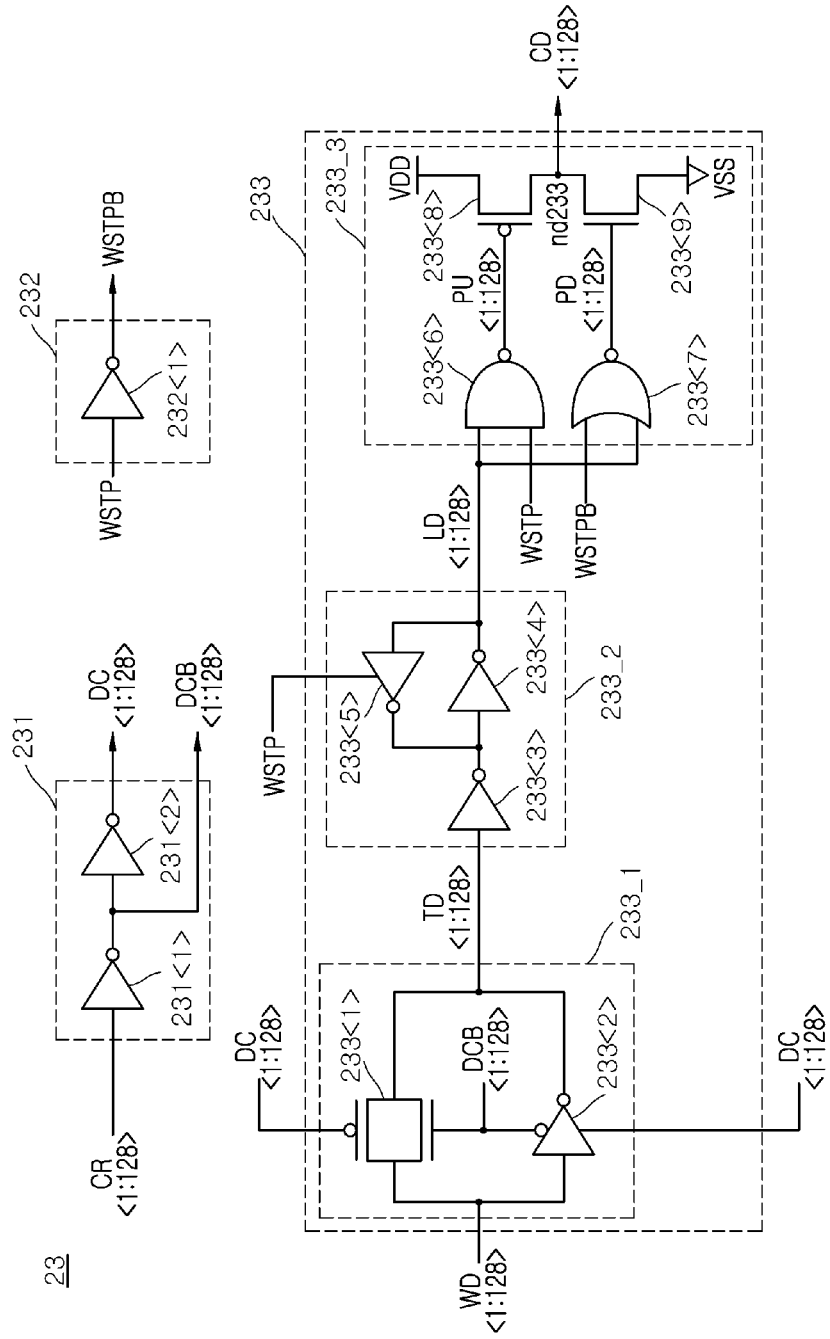
FIG. 3 is a circuit diagram illustrating a configuration according to an embodiment of a write driver included in the semiconductor device shown in FIG. 1.

FIG. 3 is a circuit diagram illustrating a configuration according to an embodiment of the write driver 23 included in the write circuit 20 shown in FIG. 1. The write driver 23 may include a drive control signal generation circuit 231, an inverted write strobe signal generation circuit 232, and a data error correction circuit 233.

The drive control signal generation circuit 231 may be implemented with inverters 231<1> and 231<2>. The inverter 231<1> may invert the first to $128^{th}$ error correction signals CR<1:128> to generate first to $128^{th}$ inverted drive control signals DCB<1:128>. The inverter 231<2> may invert the first to $128^{th}$ inverted drive control signals DCB<1:128> to generate first to $128^{th}$ drive control signals DC<1:128>. Although the drive control signal generation circuit 231 is shown as one circuit, the drive control signal generation circuit 231 may be implemented with 128 circuits for generating the first to $128^{th}$ inverted drive control signals DCB<1:128> and the first to $128^{th}$ drive control signals DC<1:128>.

The inverted write strobe signal generation circuit 232 may be implemented with an inverter 232<1>. The inverter 232<1> may invert the write strobe signal WSTP to generate an inverted write strobe signal WSTPB.

The data error correction circuit 233 may include a transfer data generation circuit 233_1, a latch data generation circuit 233_2, and a data drive circuit 233_3.

The transfer data generation circuit 233_1 may be implemented with a transfer gate 233<1> and an inverter 233<2>.

The transfer gate 233<1> may be turned on when the first to $128^{th}$ drive control signals DC<1:128> are at a logic "low" level and the first to $128^{th}$ inverted drive control signals DCB<1:128> are at a logic "high" level. The transfer gate 233<1> may output the first to $128^{th}$ write data WD<1:128> as first to $128^{th}$ transfer data TD<1:128> when the first to $128^{th}$ drive control signals DC<1:128> are at a logic "low" level and the first to $128^{th}$ inverted drive control signals DCB<1:128> are at a logic "high" level. The inverter 233<2> may be turned on when the first to $128^{th}$ drive control signals DC<1:128> are at a logic "high" and the first to $128^{th}$ inverted drive control signals DCB<1:128> are at a logic "low" level. The inverter 233<2> may invert the first to $128^{th}$ write data WD<1:128> to output as the first to $128^{th}$ transfer data TD<1:128> when the first to $128^{th}$ drive control signals DC<1:128> are at a logic "high" level and the first to $128^{th}$ inverted drive control signals DCB<1:128> are at a logic "low" level. For example, the transfer data generation circuit 233_1 may invert the first write data WD<1> among the first to $128^{th}$ write data WD<1:128> to generate the first to $128^{th}$ transfer data TD<1:128> when the first drive control signal DC<1> is at a logic "high" level and the first inverted drive control signal DCB<1> is at a logic "low" level. Although the transfer data generation circuit 233_1 is shown as one circuit, the transfer data generation circuit 233_1 may be implemented with 128 circuits for generating the first to $128^{th}$ transfer data TD<1:128>.

The latch data generation circuit 233_2 may be implemented with inverters 233<3>, 233<4>, and 233<5>.

The inverters 233<3> and 233<4> may buffer the first to $128^{th}$ transfer data TD<1:128> to generate first to $128^{th}$ latch data LD<1:128>. The inverters 233<4> and 233<5> may latch the first to $128^{th}$ latch data LD<1:128> when the write strobe signal WSTP is enabled at a logic "high" level. Although the latch data generation circuit 233_2 is shown as one circuit, the latch data generation circuit 233_2 may be implemented with 128 circuits for generating the first to $128^{th}$ latch data LD<1:128>.

The data drive circuit 233_3 may include a NAND gate 233<6>, a NOR gate 233<7>, a PMOS transistor 233<8>, and an NMOS transistor 233<9>.

The NAND gate 233<6> may invert the first to $128^{th}$ latch data LD<1:128> to generate first to $128^{th}$ pull-up signals PU<1:128> when the write strobe signa WSTP is generated at a logic "high" level. The NAND gate 233<6> may generate the first to $128^{th}$ pull-up signals PU<1:128> having logic "high" levels when the write strobe signal WSTP is generated at a logic "low" level. The NOR gate 233<7> may invert the first to $128^{th}$ latch data LD<1:128> to generate first to $128^{th}$ pull-down signals PD<1:128> when the inverted write strobe signal WSTPB is generated at a logic "low" level. The NOR gate 233<7> may generate the first to $128^{th}$ pull-down signals PD<1:128> having logic "low" levels when the inverted write strobe signal WSTPB is generated at a logic "high" level. The PMOS transistor 233<8> may be located between a power supply voltage VDD and a node nd233, and may drive the node nd233 to the power supply voltage VDD level to generate the first to $128^{th}$ correction data CD<1:128> of a logic "high" level when the first to $128^{th}$ pull-up signals PU<1:128> are at a logic "low" level. For example, the PMOS transistor 233<8> may drive the node nd233 to the power supply voltage VDD level to generate the first correction data CD<1> of a logic "high" level when the first pull-up signal PU<1> is at a logic "low" level. The NMOS transistor 233<9> may be located between the node nd233 and a ground voltage VSS, and may drive the node nd233 to the ground voltage VSS level to generate the first to $128^{th}$ correction data CD<1:128> of a logic "low" level. For example, the NMOS transistor 233<9> may drive the node nd233 to the ground voltage VSS level to generate the first correction data CD<1> of a logic "low" level when the first pull-down signal PD<1> is at a logic "high" level. The data drive circuit 233_3 is shown as one circuit, but may be implemented with 128 circuits for generating the first to $128^{th}$ correction data CD<1:128>.

Figure 4:
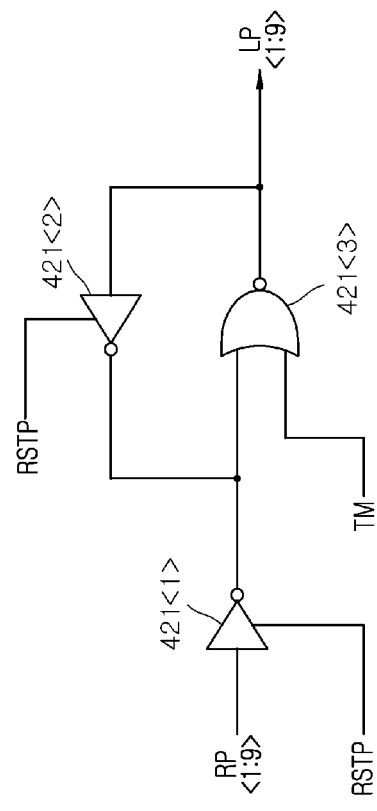
FIG. 4 is a circuit diagram illustrating a configuration according to an embodiment of a latch circuit included in the semiconductor device shown in FIG. 1.

FIG. 4 is a circuit diagram illustrating a configuration according to an embodiment of the latch circuit 42 included in the read circuit 40 shown in FIG. 1.

The latch circuit 42 may be implemented with inverters 421<1> and 421<2> and a NOR gate 421<3>.

The inverter 421<1> may invert the first to ninth read parity RP<1:9> to output inverted signals of the first to ninth read parity RP<1:9>. The NOR gate 421<3> may invert an output signal of the inverter 421<1> to generate the first to ninth latch parity LP<1:9> when the test mode signal TM is at a logic "low" level. The NOR gate 421<3> may generate the first to ninth latch parity LP<1:9> having logic "low" levels when the test mode signal TM is at a logic "high" level. The inverter 421<2> and the NOR gate 421<3> may latch the first to ninth latch parity LP<1:9> when the read strobe signal RSTP is at a logic "high" level. The latch circuit 42 is shown as one circuit, but may be implemented with nine circuits for generating the first to ninth latch parity LP<1:9>.

Figure 5:
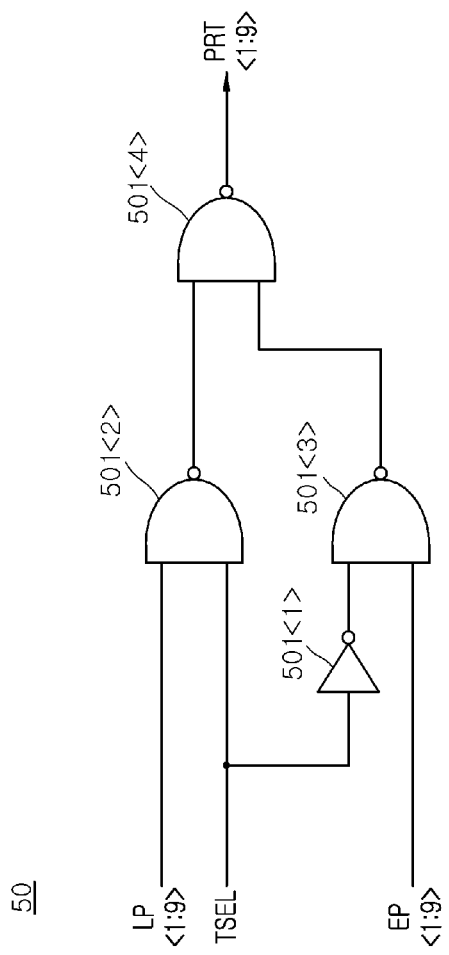
FIG. 5 is a circuit diagram illustrating a configuration according to an embodiment of a parity selection circuit included in the semiconductor device shown in FIG. 1.

FIG. 5 is a circuit diagram illustrating a configuration according to an embodiment of the parity selection circuit 50 included in the semiconductor device 1 shown in FIG. 1.

The parity selection circuit 50 may be implemented with an inverter 501<1> and NAND gates 501<2>, 501<3>, and 501<4>.

The inverter 501<1> may invert the test selection signal TSEL to output an inverted signal of the test selection signal TSEL. The NAND gate 501<2> may invert the first to ninth latch parity LP<1:9> to output inverted signals of the first to ninth latch parity LP<1:9> when the test selection signal TSEL is at a logic "high" level. The NAND gate 501<2> may generate an output signal of a logic "high" level when the test selection signal TSEL is at a logic "low" level. The NAND gate 501<3> may invert the first to ninth external parity EP<1:9> to output inverted signals of the first to ninth external parity EP<1:9> when an output signal of the inverter 501<1> is at a logic "high" level. The NAND gate 501<3> may generate an output signal of a logic "high" level when the output signal of the inverter 501<1> is at a logic "low" level. The NAND gate 501<4> may invert the output signal of the NAND gate 501<2> to generate the first to ninth parity PRT<1:9> when the output signal of the NAND gate 501<3> is at a logic "high" level. The NAND gate 501<4> may invert the output signal of the NAND gate 501<3> to generate the first to ninth parity PRT<1:9> when the output signal of the NAND gate 501<2> is at a logic "high" level.

Figure 6:
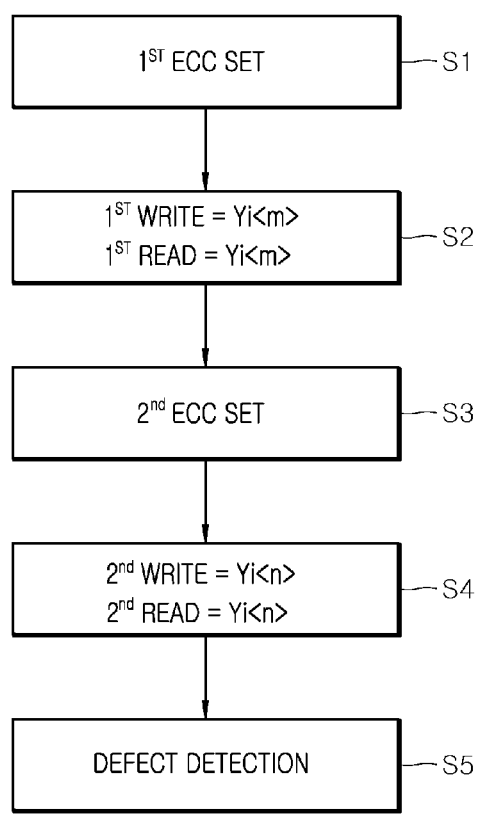
FIG. 6 is a flowchart illustrating a test mode operation of a semiconductor device according to an embodiment of the present disclosure.

FIG. 6 is a flowchart illustrating a test mode of the semiconductor device 1 according to an embodiment of the present disclosure. The operations for performing the test mode operation in the semiconductor device 1 will be described with reference to FIG. 6, together with FIG. 1.

The operations for performing the test mode may include a first error correction circuit setting step S1, a first write read operation step S2, a second error correction circuit setting step S3, a second write read operation step S4, and a defect detection step S5.

The first error correction circuit setting step S1 may be set as a step of turning off the write error correction circuit 22 and turning on the read error correction circuit 41.

In the first error correction circuit setting step S1, the mode register set 11 may generate the test selection signal TSEL that is enabled at a logic "high" level. The mode register set 11 may generate the test read control signal TR_CTR that is enabled at a logic "high" level and the test write control signal TW_CTR that is disabled at a logic "low" level.

The write alignment circuit 21 may sequentially latch and align the first to $128^{th}$ data DATA<1:128> input in series to generate the first to $128^{th}$ write data WD<1:128>.

The write error correction circuit 22 may be turned off when the test write control signal TW_CTR is disabled at a logic "low" level and might not generate the first to $128^{th}$ error correction signals CR<1:128>.

The read error correction circuit 41 may be turned on when the test read control signal TR_CTR is enabled at a logic "high" level.

The first write read operation step S2 may be set as a step of performing a write operation and a read operation for a first selected location Yi(m) in the test mode.

In the first write read operation step S2, the write/read control circuit 12 may generate the write strobe signal WSTP for performing the write operation, based on the first to "M"$^{th}$ commands CMD<1:M>.

The write driver 23 may generate the first to $128^{th}$ correction data CD<1:128> from the first to $128^{th}$ write data WD<1:128> in synchronization with the write strobe signal WSTP. Because the first to $128^{th}$ error correction signals CR<1:128> are not generated, the write driver 23 might not correct errors in the first to $128^{th}$ write data WD<1:128>.

The memory circuit 30 may store the first to $128^{th}$ correction data CD<1:128> in the first selected location Yi(m), based on a first combination of the first to "L"$^{th}$ addresses ADD<1:L> during the write operation.

The write/read control circuit 12 may generate the read strobe signal RSTP for performing the read operation, based on the first to "M"$^{th}$ commands CMD<1:M>.

The memory circuit 30 may output the first to $128^{th}$ correction data CD<1:128> stored in the first selected location Yi(m), based on the first combination of the first to "L"$^{th}$ addresses ADD<1:L> as the first to $128^{th}$ read data RD<1:128> during the read operation.

The read error correction circuit 41 may generate the first to ninth read parity RP<1:9> including error information on the first to $128^{th}$ read data RD<1:128> when the test read control signal TR_CTR is enabled at a logic "high" level.

The latch circuit 42 may latch the first to ninth read parity RP<1:9> in synchronization with the read strobe signal RSTP to generate the first to ninth latch parity LP<1:9>.

The parity selection circuit 50 may output the first to ninth latch parity LP<1:9> as the first to ninth parity PRT<1:9> when the test selection signal TSEL is enabled at a logic "high" level.

The second error correction circuit setting step S3 may be set as a step of turning on the write error correction circuit 22 and turning off the read error correction circuit 41.

In the second error correction circuit setting step S3, the mode register set 11 may generate the test read control signal TR_CTR that is disabled at a logic "low" level, and generate the test write control signal TW_CTR that is enabled at a logic "high" level.

The write alignment circuit 21 may sequentially latch and align the first to $128^{th}$ data DATA<1:128> input in series to generate the first to $128^{th}$ write data WD<1:128>. In this case, the first to $128^{th}$ write data WD<1:128> may be generated to have the same logic level combination as the first to $128^{th}$ read data RD<1:128> output from the memory circuit 30 in the first write read operation step S2.

The write error correction circuit 22 may perform an ECC encoding operation on the first to $128^{th}$ write data WD<1:128> to generate the first to eighth write parity WP<1:8> when the test write control signal TW_CTR is enabled at a logic "high" level. The write error correction circuit 22 may compare the first to eighth write parity WP<1:8> and the first to ninth parity PRT<1:9>, and perform an ECC decoding operation to generate the first to $128^{th}$ error correction signals CR<1:128> when the test write control signal TW_CTR is enabled at a logic "high" level.

The read error correction circuit 41 may be turned off and might not generate the first to eighth read parity RP<1:8> when the test read control signal TR_CTR is disabled at a logic "low" level.

The second write read operation step S4 may be set as a step of performing a write operation and a read operation on a second selected location Yi(n) in the test mode.

The write/read control circuit 12 may generate the write strobe signal WSTP for performing the write operation, based on the first to "M"$^{th}$ commands CMD<1:M>.

The write driver 23 may correct errors included in the first to 128$^{th}$ write data WD<1:128> to generate the first to 128$^{th}$ correction data CD<1:128>, based on the first to 128$^{th}$ error correction signals CR<1:128> in synchronization with the write strobe signal WSTP.

In this case, when a defect occurs in the write error correction circuit 22, because one of the first to 128$^{th}$ error correction signals CR<1:128> is enabled, the write driver 23 may invert one bit of the first to 128$^{th}$ write data WD<1:128> to generate the first to 128$^{th}$ correction data CD<1:128>.

In addition, when no defect occurs in the write error correction circuit 22, because the first to 128$^{th}$ error correction signals CR<1:128> are all disabled, the write driver 23 may generate the first to 128$^{th}$ correction data CD<1:128> without inverting the bits of the first to 128$^{th}$ write data WD<1:128>.

The memory circuit 30 may store the first to 128$^{th}$ correction data CD<:128> in the second selected location Yi(n), based on the second combination of the first to "L"$^{th}$ addresses ADD<1:L> during the write operation.

The write/read control circuit 12 may generate the read strobe signal RSTP for performing the read operation, based on the first to "M"$^{th}$ commands CMD<1:M>.

The memory circuit 30 may output the first to 128$^{th}$ correction data CD<:128> stored in the second selected location Yi(n), based on the second combination of the first to "L"$^{th}$ addresses ADD<1:L> as the first to 128th read data RD<1:128> during the read operation.

The defect detection step S5 may be set as a step of comparing the first to 128$^{th}$ write data WD<1:128> and the first to 128$^{th}$ read data RD<1:128> to detect the defect of the write error correction circuit 22.

In the defect detection step S5, the comparison circuit 60 may compare the first to 128$^{th}$ write data WD<1:128> and the first to 128$^{th}$ read data RD<1:128> to generate the detection signal DET.

Here, when a defect occurs in the write error correction circuit 22, because the first to 128$^{th}$ write data WD<1:128> and the first to 128$^{th}$ read data RD<1:128> have different logic level combinations, the comparison circuit 60 may generate the detection signal DET that is enabled at a logic "high" level. The detection signal DET may be output to the controller (1300 in FIG. 12) through the third pad P3, and the controller (1300 in FIG. 12) may detect that the defect has occurred in the write error correction circuit 22 by receiving the detection signal DET of a logic "high" level.

In addition, when no defect occurs in the write error correction circuit 22, because the first to 128$^{th}$ write data WD<1:128> and the first to 128$^{th}$ read data RD<1:128> have the same logic level combination, the comparison circuit 60 may generate the detection signal DET that is disabled at a logic "low" level. The detection signal DET may be output to the controller (1300 in FIG. 12) through the third pad P3, and the controller (1300 in FIG. 12) may detect that no defect has occurred in the write error correction circuit 22 by receiving the detection signal DET of a logic "low" level.

Figure 7:
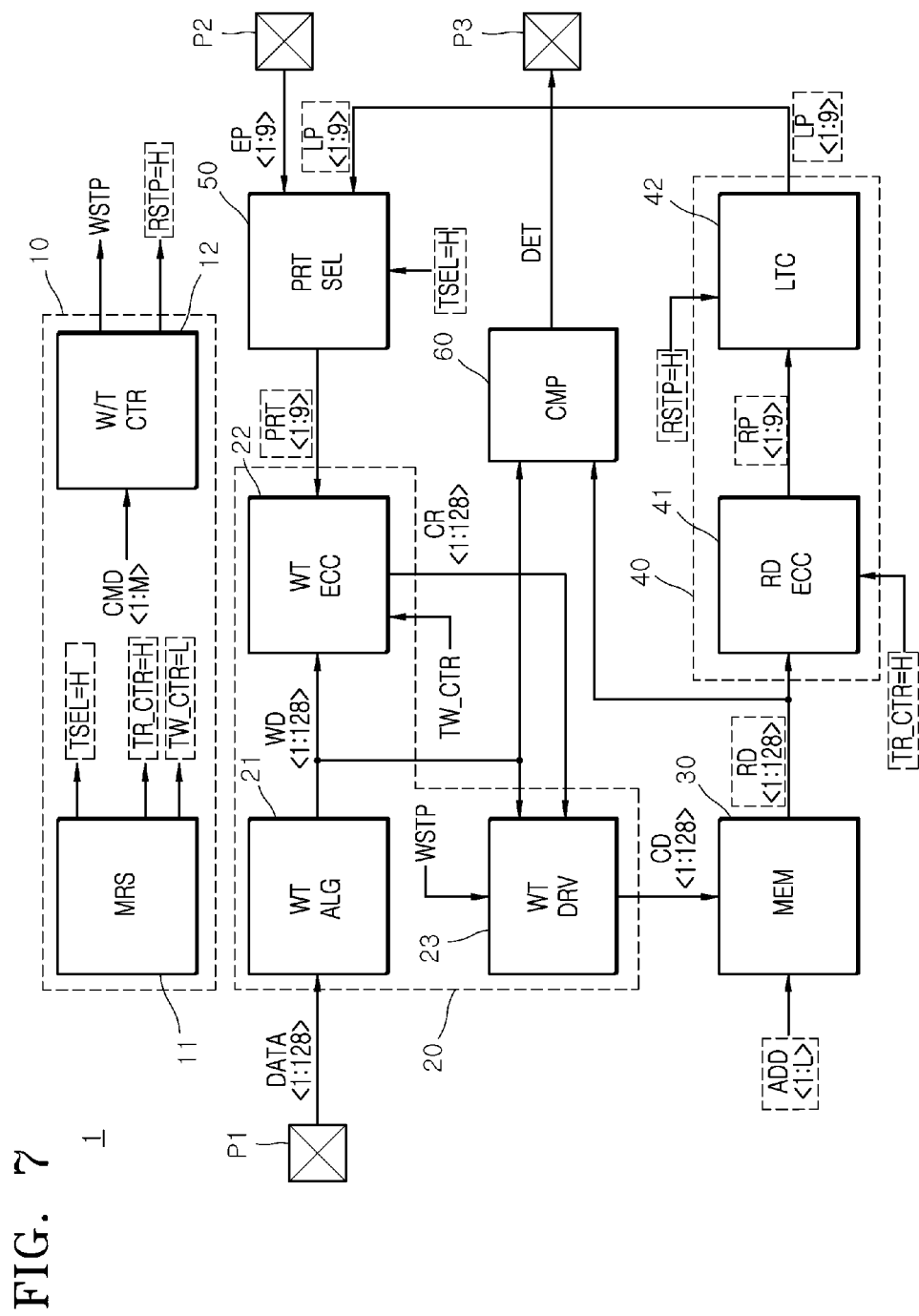
FIGS. 7 to 9 are diagrams illustrating a test mode operation of a semiconductor device according to an embodiment of the present disclosure.
Figure 8:
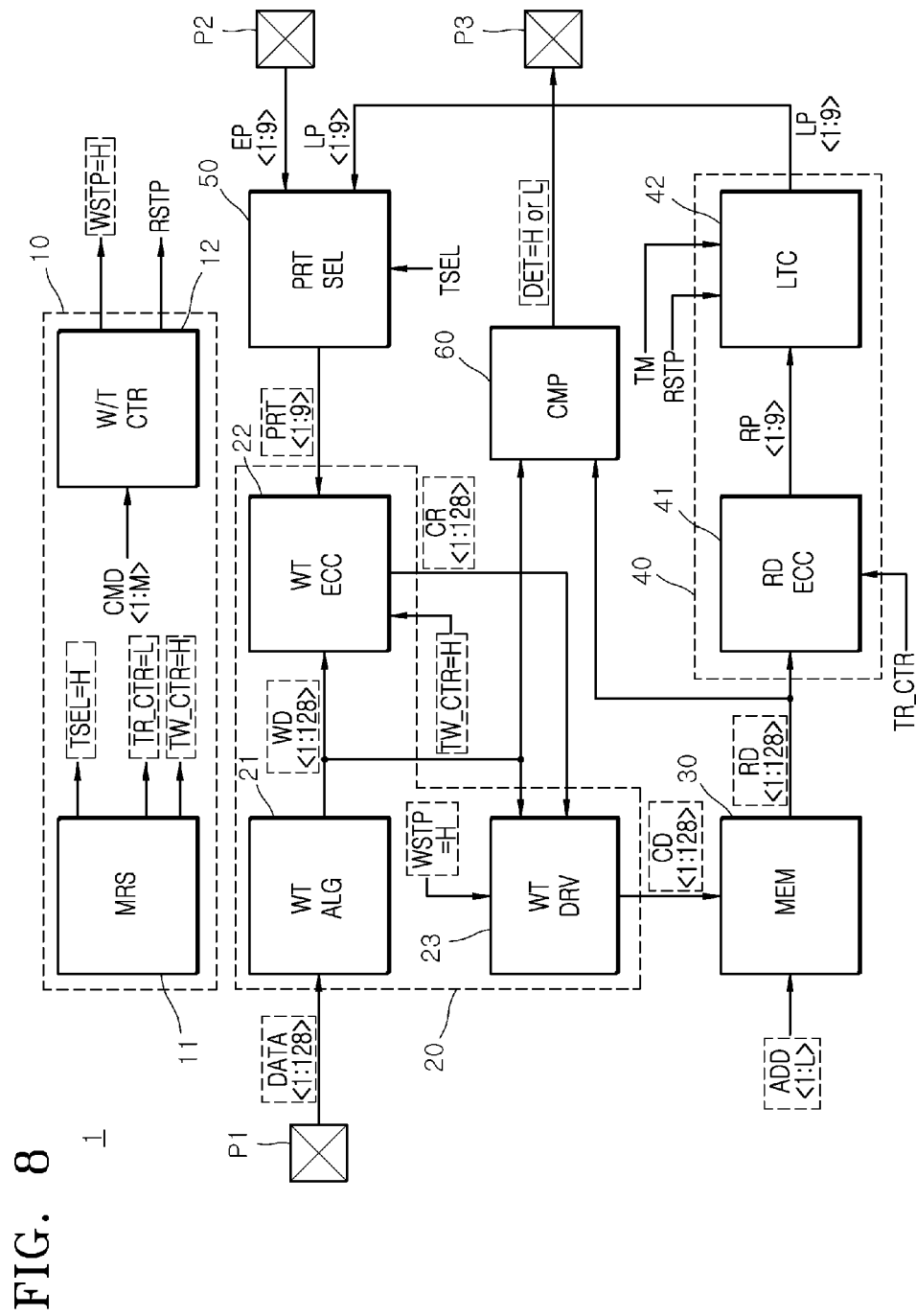
Figure 9:
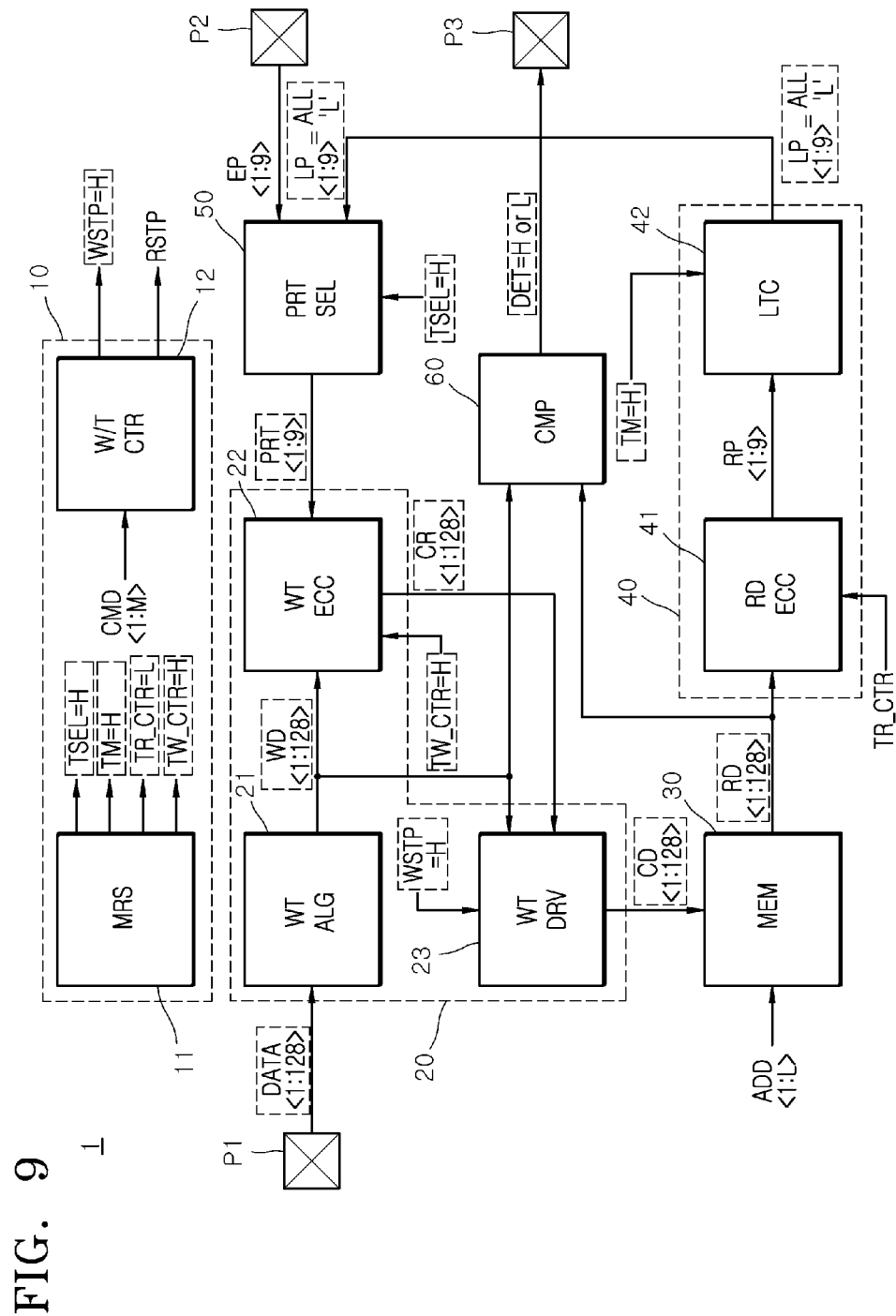

FIGS. 7 to 9 are diagrams illustrating a test mode of the semiconductor device 1 according to an embodiment of the present disclosure. The operations during a read operation in the test mode of the semiconductor device 1 will be described with reference to FIG. 7, together with FIG. 1.

Referring to FIG. 7, the mode register set 11 may generate the test selection signal TSEL that is enabled at a logic "high" level. The mode register set 11 may generate the test read control signal TR_CTR that is enabled at a logic "high" level, and generate the test write control signal TW_CTR that is disabled at a logic "low" level during the read operation in the test mode.

The write/read control circuit 12 may generate the read strobe signal RSTP including a pulse of a logic "high" level that is generated when the first to "M"$^{th}$ commands CMD<1:M> have a logic level combination for performing the read operation in the test mode.

The memory circuit 30 may output the first to 128$^{th}$ correction data CD<1:128> stored in the selected location (memory cell) as the first to 128$^{th}$ read data RD<1:128>, based on a combination of the first to "L"$^{th}$ addresses ADD<1:L> during the read operation in the test mode.

The read error correction circuit 41 may generate the first to ninth read parity RP<1:9> including error information on the first to 128$^{th}$ read data RD<1:128> when the test read control signal TR_CTR is enabled at a logic "high" level.

The latch circuit 42 may latch the first to ninth read parity RP<1:9> in synchronization with the read strobe signal RSTP of a logic "high" level, and output the latched first to ninth read parity RP<1:9> as the first to ninth latch parity LP<1:9>.

The parity selection circuit 50 may output the first to ninth latch parity LP<1:9> as the first to ninth parity PRT<1:9> when the test selection signal TSEL is enabled at a logic "high" level.

The operations of the semiconductor device 1 during the write operation in the test mode will be described with reference to FIG. 8, together with FIG. 1.

Referring to FIG. 8, the mode register set 11 may generate the test selection signal TSEL that is enabled at a logic "high" level in the test mode. The mode register set 11 may generate the test read control signal TR_CTR that is disabled at a logic "low" level, and generate the test write control signal TW_CTR that is enabled at a logic "high" level during the write operation in the test mode.

The write/read control circuit 12 may generate the write strobe signal WSTP including a pulse of a logic "high" level generated when the first to "M"$^{th}$ commands CMD<1:M> have a logic level combination for performing the write operation in the test mode.

The write alignment circuit 21 may sequentially latch the first to 128$^{th}$ data DATA<1:128> input in series, and align the latched first to 128$^{th}$ data DATA<1:128> to generate the first to 128$^{th}$ write data WD<1:128>.

The write error correction circuit 22 may perform an ECC encoding operation on the first to 128$^{th}$ write data WD<1:128> to generate the first to eighth write parity (WP<1:8> in FIG. 2) when the test write control signal TW_CTR is enabled at a logic "high" level. The write error correction circuit 22 may compare the first to eighth write parity (WP<1:8> in FIG. 2) and the first to eighth parity PRT<1:8> to generate the first to 128$^{th}$ error correction signals CR<1:128> when the test write control signal TW_CTR is enabled at a logic "high" level.

The write driver 23 may correct an error included in the first to 128$^{th}$ write data WD<1:128> to generate the first to 128$^{th}$ correction data CD<1:128>, based on the first to 128$^{th}$ error correction signals CS<1:128> in synchronization with the write strobe signal WSTP of a logic "high" level.

The write driver 23 may correct the error included in the first to 128$^{th}$ write data WD<1:128> to generate the first to 128$^{th}$ correction data CD<1:128>, based on the first to 128$^{th}$ error correction signals CR<1:128> in synchronization with the write strobe signal WSTP of a logic "high" level.

The memory circuit 30 may store the first to 128$^{th}$ correction data CD<1:128> in a selected location (memory cell), based on a combination of the first to "L"$^{th}$ addresses ADD<1:L> during the write operation in the test mode.

The comparison circuit 60 may generate the detection signal DET that is enabled at a logic "high" level H when the first to 128$^{th}$ write data WD<1:128> and the first to 128$^{th}$ read data RD<1:128> have different logic level combinations in the test mode.

The comparison circuit 60 may generate the detection signal DET that is disabled at a logic "low" level L when the first to 128$^{th}$ write data WD<1:128> and the first to 128$^{th}$ read data RD<1:128> have the same logic level combination in the test mode.

The detection signal DET may be output to external device through the third pad P3.

The controller (1300 in FIG. 10) or a test device (not shown) may detect that a defect has occurred in the write error correction circuit 22 when the detection signal DET is enabled at a logic "high" level H.

The controller (1300 in FIG. 10) or a test device (not shown) may detect that there is no defect in the write error correction circuit 22 when the detection signal DET is disabled at a logic "low" level L.

As described above, the semiconductor device 1 according to an embodiment of the present disclosure may generate parity, based on read data stored in a memory circuit during a read operation in a test mode, and perform an error correction operation for the data, based on write parity and the parity generated from the data input during a write operation in the test mode. The semiconductor device 1 may generate the parity, based on read data stored in the memory circuit during the read operation in the test mode, and detect a defect in an error correction circuit according to whether an error correction operation is performed on the data, based on the write parity and the parity generated from the data input during write operation in the test mode. The semiconductor device 1 may output a detection signal generated according to whether the error correction operation is performed on the data to a controller (1300 in FIG. 1) or a test device (not shown), thereby providing the controller (1300 in FIG. 10) or the test device (not shown) with whether a defect occurred in the error correction circuit.

The operations during a compression test in the test mode of the semiconductor device 1 according to an embodiment of the present disclosure will be described with reference to FIG. 9, together with FIG. 1.

Referring to FIG. 9, the mode register set 11 may generate the test selection signal TSEL that is enabled at a logic "high" level H in the test mode. The mode register set 11 may generate the test mode signal TM that is enabled at a logic "high" level H for performing the compression test in the test mode. The mode register set 11 may generate the test read control signal TR_CTR that is disabled at a logic "low" level L, and generate the test write control signal TW_CTR that is enabled at a logic "high" level H during a write operation in the test mode.

The latch circuit 42 may generate the first to ninth latch parity LP<1:9> all having a logic "low" level ALL='L' when the test mode signal TM is enabled at a logic "high" level H.

The parity selection circuit 50 may output the first to ninth latch parity LP<1:9> as the first to ninth parity PRT<1:9> when the test selection signal TSEL is enabled at a logic "high" level H.

The write/read control circuit 12 may generate the write strobe signal WSTP including a pulse of a logic "high" level H generated when the first to "M"$^{th}$ commands CMD<1:M> have a logic level combination for performing a write operation in the test mode.

The write alignment circuit 21 may sequentially latch the first to 128$^{th}$ data DATA<1:128> input in series, and align the latched first to 128$^{th}$ data DATA<1:128> to generate the first to 128$^{th}$ write data WD<1:128>. In this case, in the compression test, all of the first to 128$^{th}$ data DATA<1:128> may be input at the same logic level. All of the first to 128$^{th}$ write data WD<1:128> may be generated at the same logic level.

The write error correction circuit 22 may perform an ECC encoding operation on the first to 128$^{th}$ write data WD<1:128> to generate the first to eighth write parity (WP<1:8> in FIG. 2) all having a logic "low" level ALL='L' when the test write control signal TW_CTR is enabled at a logic "high" level H. The write error correction circuit 22 may compare the first to eighth write parity (WP<1:8> in FIG. 2) and the first to eighth parity PRT<1:8> to generate the first to 128$^{th}$ error correction signals CR<1:128> when the test write control signal TW_CTR is enabled at a logic "high" level H. In this case, when a defect occurs in the write error correction circuit 22, at least one of the first to 128$^{th}$ error correction signals CR<1:128> may be enabled. When no defect occurs in the write error correction circuit 22, all of the first to 128$^{th}$ error correction signals CR<1:128> may be generated at a logic "low" level.

When at least one of the first to 128$^{th}$ error correction signals CR<1:128> is enabled, the write driver 23 may correct errors included in the first to 128$^{th}$ write data WD<1:128> to generate the first to 128$^{th}$ correction data CD<1:128> in synchronization with the write strobe signal WSTP of a logic "high" level H. When all of the first to 128$^{th}$ error correction signals CR<1:128> are generated at a logic "low" level, the write driver 23 may generate the first to 128$^{th}$ correction data CD<1:128> in synchronization with the write strobe signal WSTP of a logic "high" level H without inverting the first to 128$^{th}$ write data WD<1:128>.

The memory circuit 30 may store the first to 128$^{th}$ correction data CD<1:128> in a selected location (memory cell), based on the combination of the first to "L"$^{th}$ addresses ADD<1:128> during the write operation in the test mode.

The comparison circuit 60 may generate the detection signal DET that is enabled at a logic "high" level H when the first to 128$^{th}$ write data WD<1:128> and the first to 128$^{th}$ read data RD<1:128> have different logic level combinations in the test mode.

The comparison circuit 60 may generate the detection signal DET that is disabled at a logic "low" level L when the first to 128$^{th}$ write data WD<1:128> and the first to 128$^{th}$ read data RD<1:128> have the same logic level combination in the test mode.

The detection signal DET may be output to the external device through the third pad P3.

The controller (1300 in FIG. 10) or the test device (not shown) may detect that a defect has occurred in the write error correction circuit 22 when the detection signal DET is enabled at a logic "high" level H.

The controller (1300 in FIG. 10) or the test device (not shown) may detect that no defect has occurred in the write error correction circuit 22 when the detection signal DET is disabled at a logic "low" level L.

As described above, the semiconductor device 1 according to an embodiment of the present disclosure may generate all parity at the same logic level during a compression test in a test mode, and perform an error correction operation on data, based on write parity and the parity generated from the data input at the same logic level. The semiconductor device 1 may generate all parity at the same logic level in the compression test of the test mode, and detect a defect in an error correction circuit according to whether an error correction operation is performed on the data, based on the parity and the write parity generated from the input data during the write operation in the test mode. The semiconductor device 1 may output a detection signal generated according to whether the error correction operation is performed on the data to a controller (1300 in FIG. 1) or a test device (not shown), thereby providing the controller (1300 in FIG. 10) or a test device (not shown) with whether a defect has occurred in the error correction circuit.

Figure 10:
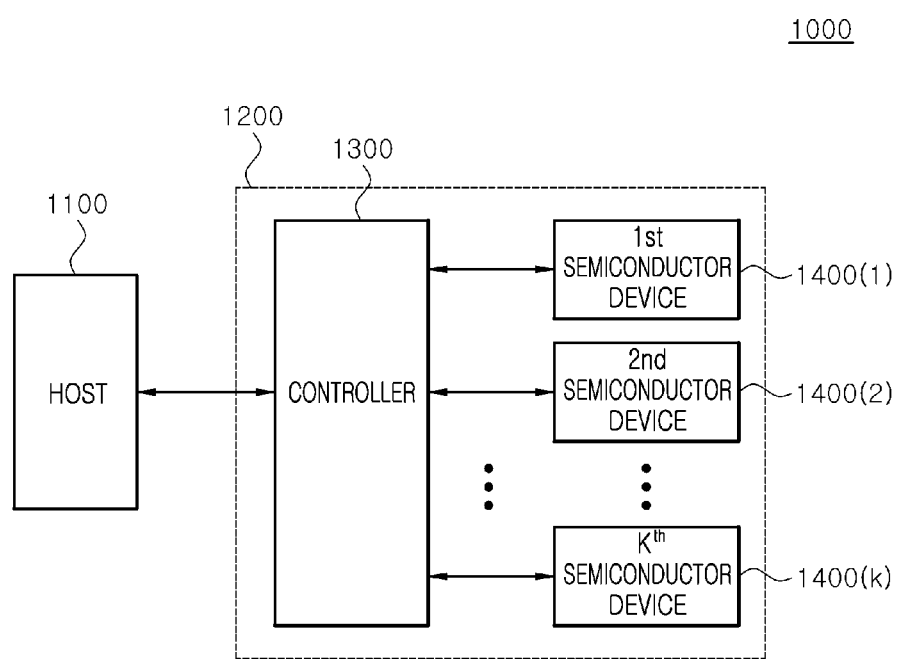
FIG. 10 is a diagram illustrating a configuration of an electronic system to which one of the semiconductor devices according to an embodiment shown in FIGS. 1 and 9 is applied.

FIG. 10 is a diagram illustrating a configuration according to an embodiment of an electronic system 1000 to which one of the semiconductor devices shown in FIGS. 1 and 9 is applied. As shown in FIG. 10, the electronic system 1000 may include a host 1100 and a semiconductor system 1200.

The host 1100 and the semiconductor system 1200 may transmit signals to each other using interface protocols. The interface protocols used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), serial attached SCSI (SAS), universal serial bus (USB), and the like.

The semiconductor system 1200 may include a controller 1300 and semiconductor devices 1400(1:K). The controller 1300 may control the semiconductor devices 1400(1:K) to perform a test mode operation. Each of the semiconductor devices 1400(1:K) may generate parity, based on read data stored in a memory circuit during a read operation in the test mode, and perform an error correction operation on the data, based on write parity generated from data input during a write operation in the test mode and the parity. Each of the semiconductor devices 1400(1:K) may generate the parity at the same logic level during a compression test in the test mode, and perform an error correction operation for the data, based on the write parity and parity generated from the data input at the same logic level during the write operation in the test mode. Each of the semiconductor devices 1400(1:K) may generate the parity, based on read data stored in the memory circuit during a read operation in the test mode, and detect a defect in the error correction circuit according to whether an error correction operation is performed on the data, based on the parity and the write parity generated from the input data during the write operation in the test mode. Each of the semiconductor devices 1400(1:K) may output a detection signal generated according to whether an error correction operation is performed on the data to the controller, thereby providing the controller 1300 with whether a defect has occurred in the error correction circuit.

The controller 1300 may be implemented as a general controller or test device for controlling a semiconductor device. Each of the semiconductor devices 1400(1:K) may be implemented as the semiconductor device 1 shown in FIG. 2. According to different embodiments, each of the semiconductor devices 1400(1:K) may be implemented with one of a dynamic random-access memory (DRAM) device, a phase change random-access memory (PRAM) device, a resistive random-access memory (RRAM) device, a magnetic random-access memory (MRAM) device, and ferro-electric random-access memory (FRAM) device.

Concepts have been disclosed in conjunction with some embodiments as described above. Those skilled in the art will appreciate that various modifications, additions, and/or substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A semiconductor device comprising:
    a read circuit configured to latch read parity including error information on read data output from a memory circuit to generate latch parity when a test read control signal is enabled;
    a parity selection circuit configured to output the latch parity as parity when a test selection signal is enabled; and
    a write circuit configured to receive write data generated from data and the parity, and to correct error of the write data, based on write parity including error information on the write data and the parity to generate correction data when a test write control signal is enabled.

2. The semiconductor device of claim 1, wherein the memory circuit is configured to store the correction data in a test mode, and to output the stored correction data as the read data in the test mode.

3. The semiconductor device of claim 1, wherein bits included in the write data are generated at the same logic level combination as the logic level combination of bits included in the read data.

4. The semiconductor device of claim 1, wherein the read circuit includes:
    a read error correction circuit configured to generate the read parity including error information on the read data when the test read control signal is enabled; and
    a latch circuit configured to latch the read parity in synchronization with a read strobe signal, and to output the latched read parity as the latch parity.

5. The semiconductor device of claim 4, wherein the read error correction circuit is configured to block generation of the read parity when the test read control signal is disabled.

6. The semiconductor device of claim 5, wherein the latch circuit is configured to generate all bits included in the latch parity at the same logic level when a test mode signal is enabled.

7. The semiconductor device of claim 1, wherein the parity selection circuit is configured to output external parity input from an external device as the parity when the test selection signal is disabled.

8. The semiconductor device of claim 1, wherein the write circuit includes:
    a write alignment circuit configured to align the data input from an external device to generate the write data;
    a write error correction circuit configured to generate the write parity including error information on the write data, and to compare the write parity and the parity to generate an error correction signal for correcting the error of the write data when the test write control signal is enabled; and
a write driver configured to correct the error of the write data, based on the error correction signal to generate the correction data.

9. The semiconductor device of claim 8, wherein the write error correction circuit includes:
a write parity generation circuit configured to perform an ECC encoding operation on the write data to generate the write parity when the test write control signal is enabled;
a syndrome generation circuit configured to compare the write parity and the parity to generate a syndrome; and
an error correction signal generation circuit configured to perform an ECC decoding operation on the syndrome to generate the error correction signal.

10. The semiconductor device of claim 9, wherein the write parity generation circuit is configured to block generation of the write parity when the test write control signal is disabled.

11. The semiconductor device of claim 8, wherein the write driver includes:
a transfer data generation circuit configured to invert an error-occurring bit among bits included in the write data to generate transfer data, based on the error correction signal;
a latch data generation circuit configured to latch the transfer data in synchronization with a write strobe signal to generate latch data; and
a data error correction circuit configured to generate the correction data according to a logic level combination of the latch data in synchronization with the write strobe signal.

12. A semiconductor device comprising:
a control circuit configured to generate a test selection signal for generating a test mode, to generate a test read control signal and a test write control signal, and to generate a read strobe signal and a write strobe signal;
a parity selection circuit configured to output one of external parity input from an external device and latch parity as parity, based on the test selection signal; and
a write circuit configured to receive write data generated from data and the parity, and to correct an error of the write data, based on write parity including error information on the write data and the parity to generate correction data, when a test write control signal is enabled.

13. The semiconductor device of claim 12, wherein the control circuit is configured to generate the test write control signal and the write strobe signal during a write operation in the test mode, after generating the test read control signal and the read strobe signal during a read operation in the test mode.

14. The semiconductor device of claim 12,
wherein the parity selection circuit is configured to output the latch parity as the parity when a test mode operation is performed and the test selection signal is enabled, and
wherein the parity selection circuit is configured to output the external parity as the parity when the test mode operation is terminated and the test selection signal is disabled.

15. The semiconductor device of claim 12, wherein the write circuit includes:
a write alignment circuit configured to align the data input from the external device to generate the write data;
a write error correction circuit configured to generate the write parity including error information on the write data, and to compare the write parity and the parity to generate an error correction signal for correcting the error of the write data, when the test write control signal is enabled; and
a write driver configured to correct the error of the write data, based on the error correction signal to generate the correction data.

16. The semiconductor device of claim 15, wherein the write error correction circuit includes:
a write parity generation circuit configured to perform an ECC encoding operation on the write data to generate the write parity when the test write control signal is enabled;
a syndrome generation circuit configured to compare the write parity and the parity to generate a syndrome; and
an error correction signal generation circuit configured to perform an ECC decoding operation on the syndrome to generate the error correction signal.

17. The semiconductor device of claim 16, wherein the write parity generation circuit is configured to block generation of the write parity when the test write control signal is disabled.

18. The semiconductor device of claim 15, wherein the write driver includes:
a transfer data generation circuit configured to invert an error-occurring bit among bits included in the write data to generate transfer data, based on the error correction signal;
a latch data generation circuit configured to latch the transfer data in synchronization with a write strobe signal to generate latch data; and
a data error correction circuit configured to generate the correction data according to a logic level combination of the latch data in synchronization with the write strobe signal.

19. The semiconductor device of claim 12, further comprising:
a memory circuit configured to store the correction data in a selected location, based on a combination of addresses during a write operation in the test mode, and to output the correction data stored in the selected location as read data, based on the combination of the addresses during a read operation in the test mode; and
a read circuit configured to latch read parity including error information on the read data to generate the latch parity when the test read control signal is enabled.

20. The semiconductor device of claim 19, wherein the read circuit includes:
a read error correction circuit configured to generate the read parity including error information on the read data when the test read control signal is enabled; and
a latch circuit configured to latch the read parity in synchronization with a read strobe signal, and to output the latched read parity as the latch parity.

21. The semiconductor device of claim 20, wherein the read error correction circuit is configured to block generation of the read parity when the test read control signal is disabled.

22. The semiconductor device of claim 19, further comprising a comparison circuit configured to compare logic level combinations of the write data generated from the data and the read data output from the memory circuit to generate a detection signal in the test mode.

23. The semiconductor device of claim 22, further comprising a controller configured to receive the detection signal to detect a defect of a write error correction circuit included in the write circuit.

24. The semiconductor device of claim 23,
wherein the controller is configured to detect that a defect occurred in the write error correction circuit when the detection signal is enabled, and
wherein the controller is configured to detect that no defect occurred in the write error correction circuit when the detection signal is disabled.

25. A method of performing a test mode operation, comprising:
a first error correction circuit setting step of turning off a write error correction circuit for generating write parity including error information of write data generated from data input from an external device, and turning on a read error correction circuit for generating read parity including error information on read data output from a memory circuit; and
a first write read operation step of storing the write data in a first selected location of the memory circuit, based on an address in a test mode, and outputting the write data stored in the first selected location of the memory circuit as the read data.

26. The method of claim 25, wherein in the first write read operation step, the read error correction circuit is turned on to generate the read parity including the error information of the read data, to generate latch parity from the read parity, and to generate parity from the latch parity.

27. The method of claim 25, further comprising:
a second error correction circuit setting step of turning on the write error correction circuit and turning off the read error correction circuit; and
a second write read operation step of storing the write data in a second selected location of the memory circuit, based on the address input in the test mode, and outputting the write data stored in the second selected location of the memory circuit as the read data.

28. The method of claim 27, wherein in the second write read operation step, the write error correction circuit is turned on to generate a syndrome by comparing the parity generated from the read parity with the write parity generated from the write data, to generate an error correction signal for correcting an error of the write data based on the syndrome, and to correct the error included in the write data based on the error correction signal to store error-corrected write data in the memory circuit.

29. The method of claim 27, further comprising a defect detection step of comparing the read data and the write data to generate a detection signal, and outputting the detection signal to a controller.

30. The method of claim 29,
wherein the controller detects that a defect occurred in the write error correction circuit when the detection signal is enabled, and
wherein the controller detects that there is no defect in the write error correction circuit when the detection signal is disabled.

* * * * *